US011887799B2

(12) United States Patent
Lee et al.

(10) Patent No.: US 11,887,799 B2
(45) Date of Patent: Jan. 30, 2024

(54) ARC EXTINCTION APPARATUS OF AIR CIRCUIT BREAKER

(71) Applicant: LS ELECTRIC CO., LTD., Anyang-si (KR)

(72) Inventors: Sang-Chul Lee, Anyang-si (KR); Kyu-Ho Lee, Anyang-si (KR); Seung-Pil Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 343 days.

(21) Appl. No.: 17/600,859

(22) PCT Filed: Mar. 11, 2020

(86) PCT No.: PCT/KR2020/003412

§ 371 (c)(1), (2) Date: Oct. 1, 2021

(87) PCT Pub. No.: WO2020/204387

PCT Pub. Date: Oct. 8, 2020

(65) Prior Publication Data

US 2022/0189724 A1 Jun. 16, 2022

(30) Foreign Application Priority Data

Apr. 2, 2019 (KR) ........................ 10-2019-0038584

(51) Int. Cl.
*H01H 9/30* (2006.01)
*H01H 73/18* (2006.01)
*H01H 9/34* (2006.01)

(52) U.S. Cl.
CPC ............ *H01H 73/18* (2013.01); *H01H 9/342* (2013.01); *H01H 2213/004* (2013.01)

(58) Field of Classification Search
CPC ............. H01H 2009/305; H01H 73/18; H01H 2213/004
See application file for complete search history.

(56) References Cited

U.S. PATENT DOCUMENTS

2008/0067042 A1 3/2008 Shea et al.

FOREIGN PATENT DOCUMENTS

CN 2765313 Y 3/2006
JP 2003346635 A 12/2003
(Continued)

OTHER PUBLICATIONS

International Search Report for related International Application No. PCT/KR2020/003412; report dated Oct. 8, 2020; (5 pages).
(Continued)

*Primary Examiner* — Ramon M Barrera
(74) *Attorney, Agent, or Firm* — K&L Gates LLP

(57) ABSTRACT

An arc extinction apparatus according to an embodiment of the present disclosure comprises a chamber unit, a division unit, a filter unit, and a cover unit. A discharge port is formed in the chamber unit such that a fluid in the chamber unit is discharged to the outside. An insertion groove is provided on inner faces of the chamber unit that face each other. The division unit is coupled to the inside of the chamber unit. In addition, the division unit divides a path of the fluid discharged through the discharge port into multiple paths. The filter unit is disposed in the discharge port and filters out at least one predetermined material from the fluid passing through the discharge port. The cover unit comprises a plurality of exhaust pipes and is coupled to the discharge port from the outside of the filter unit.

9 Claims, 7 Drawing Sheets

(56) References Cited

FOREIGN PATENT DOCUMENTS

| | | |
|---|---|---|
| KR | 100945346 B1 | 2/2010 |
| KR | 101659861 B1 | 9/2016 |

OTHER PUBLICATIONS

Written Opinion for related International Application No. PCT/KR2020/003412; report dated Oct. 8, 2020; (3 pages).

ARC EXTINCTION APPARATUS OF AIR CIRCUIT BREAKER

CROSS-REFERENCE TO RELATED APPLICATIONS

This application is the National Stage filing under 35 U.S.C. 371 of International Application No. PCT/KR2020/003412, filed on Mar. 11, 2020, which claims the benefit of earlier filing date and right of priority to Korea utility model Application No. 10-2019-0038584 filed on Apr. 2, 2019, the contents of which are all hereby incorporated by reference herein in their entirety.

FIELD

The present disclosure relates to an arc-extinguishing apparatus for an air circuit breaker, and, more particularly, relates to an arc-extinguishing apparatus that may prevent an arc from being spread to a path other than a predefined path.

BACKGROUND

In general, a circuit breaker refers to a device for bringing a circuit into a connected state so that current flows therein or for bringing the circuit into a disconnected state so that current does not flow therein. In addition, the circuit breaker also plays a role in quickly bringing the circuit into the disconnected state, in an abnormal state such as a short circuit.

The circuit breaker is designed in various forms from a circuit breaker for home use to medium and large-scale breakers applied to industrial and power generation facilities. Most of circuit breakers act as mechanical devices that connect or disconnect current-carrying conductors to or from each other.

Specifically, a contact of one of the conductors is fixed, and a contact of the other thereof rotates or moves linearly. When the movable contact contacts or is removed from the fixed contact, and current is cut off or is applied from or to a load. In this connection, when the fixed contact and the movable contact are in contact with each other and then removed from each other, an arc occurs.

An arc occurs when the contacts that are being in contact with each other are removed from each other. A distal end of each of the contacts through which strong current flows is overheated due to a contact resistance. When the contacts are removed from each other in the overheated state, a molten metal evaporates and thus arc discharge occurs. When the arc occurs, a temperature around the contacts rapidly increases and thus performance of the circuit breaker deteriorates. Further, the circuit breaker may be damaged due to the arc.

Korean Patent No. 10-0945346 discloses an arc-extinguishing apparatus for an air circuit breaker including an arc runner for guiding an arc generated in the circuit breaker in one direction and arc-extinguishing means for extinguishing the arc. This prior art arc-extinguishing apparatus has a structure to allow gas resulting from evaporation of the molten metal to be reliably discharged while guiding the generated arc to a predefined path. However, instantaneously occurring arc is not only guided to the intended path but is also spread to an upper end of a grid. That is, the cutting-off performance of the circuit breaker is guaranteed only when the arc is guided to the predefined path. However, when the instantaneously occurring arc is spread into a path such as the upper end of the grid instead of the predefined path, the breaker may not be able to block the current. This results in decrease in the breaking performance of the circuit breaker.

Therefore, a method for solving these problems is required.

SUMMARY

The present disclosure has been devised to solve the problems of the prior art as described above. Thus, a purpose of the present disclosure is to provide an arc-extinguishing apparatus that prevents an arc generated from contacts of a circuit breaker from being divided into several paths, thereby quickly performing arc extinguishing.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

The present disclosure provides an arc-extinguishing apparatus for an air circuit breaker, the apparatus comprising a chamber unit having a fluid outlet through which internal fluid is discharged out of the chamber unit, wherein the chamber unit has receiving grooves defined in each of opposing inner faces thereof; a dividing unit coupled to an inner face of the chamber unit for dividing a path of the fluid to be discharged to the outlet into multiple paths; a filter unit disposed at the outlet for filtering at least one predefined substance from the fluid passing through the outlet; and a cover unit having a plurality of discharge holes defined therein, wherein the cover unit is disposed on an outer face of the filter unit and is coupled to the outlet.

Further, the dividing unit includes: a plurality of grids, wherein both opposing sides of each of the grids are respectively inserted into both the opposing receiving grooves respectively defined in the opposing inner faces of the chamber unit; and each insulating cap coupled to an upper end of each of the plurality of grids, wherein each open ventilation channel is defined between adjacent grids.

In one implementation, the outlet of the chamber unit includes each blocking portion formed in a position corresponding to each ventilation channel.

In one implementation, the ventilation channels, the blocking portions, and the discharge holes are arranged such that the fluid that has passed through the ventilation channel is blocked with the blocking portion, and the fluid that has passed through the blocking portion is blocked with the cover unit, and the fluid flowing into the channel between the grids travels in at least one curved manner and then reaches the discharge hole.

In one implementation, the insulating caps are integral with each other, and the plurality of grids are respectively coupled to bottom faces of the caps.

In one implementation, the filter unit includes: a first filter disposed adjacent to the dividing unit; and a second filter disposed adjacent to the cover unit.

In one implementation, a pore size of the second filter is smaller than a pore size of the first filter.

In one implementation, the apparatus further comprises an insulating film disposed between the dividing unit and the filter unit, wherein the insulating film has multiple communication holes defined therein through which the fluid passes.

In one implementation, each insulating cap accommodates therein an upper end of each grid and a portion of each of both opposing sides of each grid.

In one implementation, the insulating cap prevents a situation where a portion of the fluid is branched to a top of the grid.

The arc-extinguishing apparatus for the air circuit breaker according to an embodiment of the present disclosure may be able to guide the arc generated inside the circuit breaker to the predefined path and thus to perform fast arc-extinguishing.

Further, the arc-extinguishing apparatus for the air circuit breaker according to an embodiment of the present disclosure may reliably discharge gas resulting from evaporation of molten metal.

Furthermore, the arc-extinguishing apparatus for the air circuit breaker according to an embodiment of the present disclosure may prevent the arc from being spread to or being generated in an unexpected path, thereby increasing current cutting-off quality.

The above-described effects, and specific effects of the present disclosure as not mentioned above will be described based on specific details for carrying out the disclosure.

DETAILED DESCRIPTION

Figure 1:
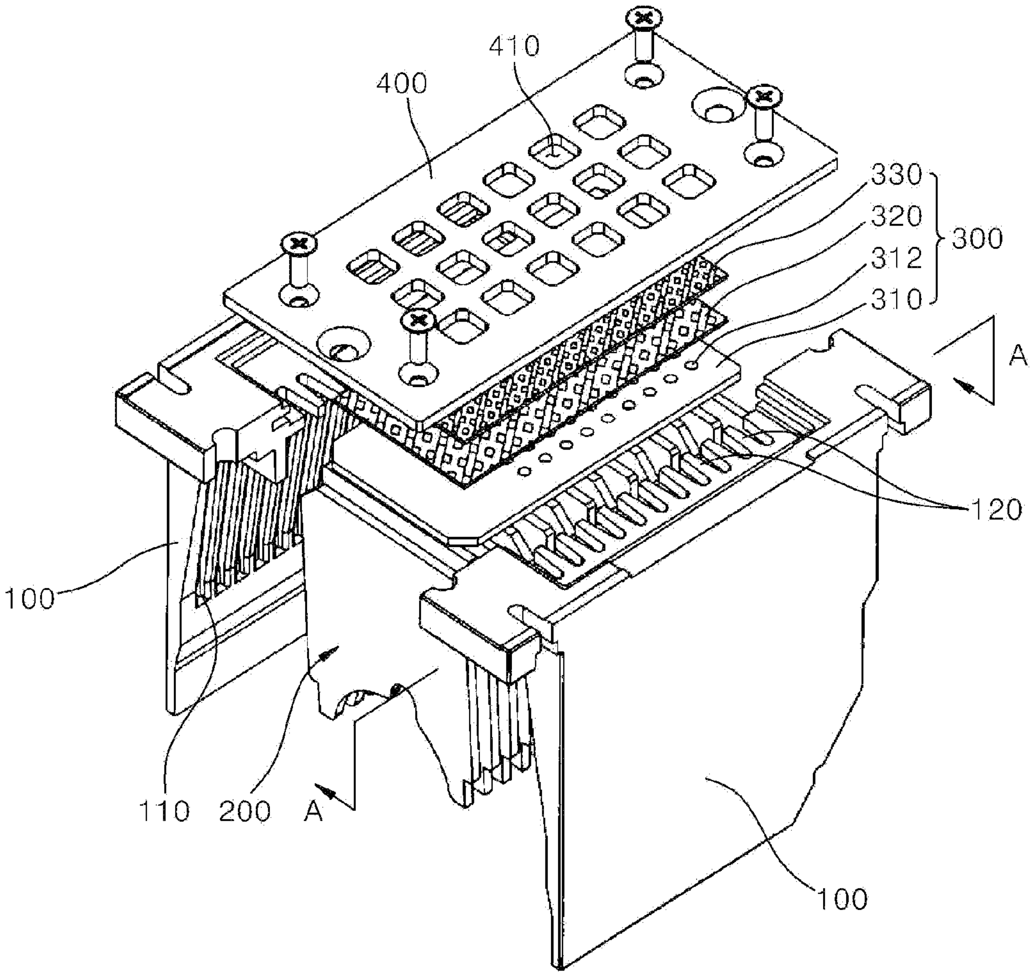
FIG. 1 is a perspective view showing an arc-extinguishing apparatus for an air circuit breaker according to an embodiment of the present disclosure.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted.

Hereinafter, a preferred embodiment according to the present disclosure will be described in detail with reference to the accompanying drawings. In the drawings, the same reference numerals are used to indicate the same or similar elements.

An arc-extinguishing apparatus for an air circuit breaker according to an embodiment of the present disclosure is achieved via improvement of a conventional arc-extinguishing apparatus.

Figure 2:
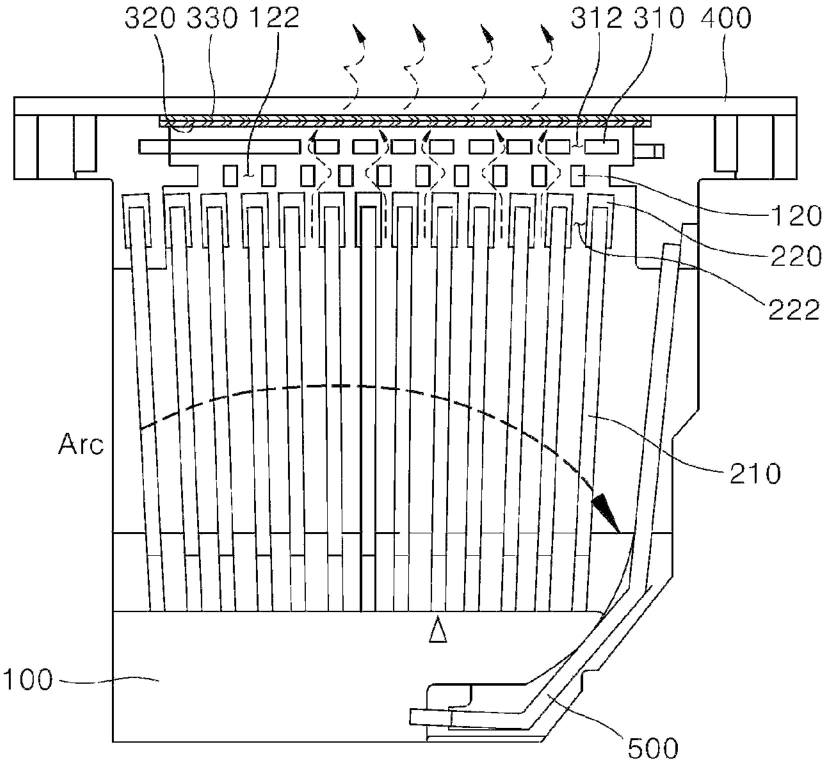
FIG. 2 is a cross-sectional view taken along a line A-A of FIG. 1 and shows a state in which an arc is divided into multiple paths in a dividing unit of an arc-extinguishing apparatus according to an embodiment of the present disclosure.

FIG. 1 is a perspective view showing an arc-extinguishing apparatus for an air circuit breaker according to an embodiment of the present disclosure. FIG. 2 is a cross-sectional view taken along a line A-A of FIG. 1.

As shown in FIG. 1 and FIG. 2, the arc-extinguishing apparatus according to an embodiment of the present disclosure includes a chamber unit 100, a dividing unit 200, a filter unit 300 and a cover unit 400.

The chamber unit 100 has an outlet defined therein through which fluid is discharged to an outside, and a receiving groove 110 defined in each of both opposing inner faces of the chamber unit 100.

The dividing unit 200 is coupled to an inner face of the chamber unit 100. The dividing unit 200 divides a path of fluid discharged to the outlet into several paths.

The filter unit 300 is disposed at the outlet. The filter unit 300 filters out at least one predefined substance from the fluid which is passing through the outlet.

The cover unit 400 includes a plurality of discharge holes 410 defined therein. The cover unit 400 is disposed on an outside of the filter unit 300 and is coupled to the outlet.

An arc runner 500 is disposed between the arc-extinguishing apparatus and a contact of the circuit breaker. The arc runner 500 guides the arc to the arc-extinguishing apparatus.

Hereinafter, each of the above components is described in more detail.

The chamber unit 100 is composed of a pair of opposing sidewalls. In an embodiment of the present disclosure, the sidewalls are coupled to each other. Further, an inner space is defined between the side walls of the chamber unit 100. The inner space of the chamber unit 100 has a lower portion having a larger dimension and an upper portion having a smaller dimension. A top opening of the chamber unit 100 acts as the outlet.

The chamber unit 100 has the receiving grooves 110 defined in each of the inner faces of the sidewalls. Each of the receiving grooves 110 extends vertically. Further, the receiving grooves 110 are arranged in a horizontal direction and spaced from each other by a predefined spacing. In addition, blocking portions 120 extending inwardly from each of the sidewalls are formed in the outlet. The blocking portions 120 together with a discharge hole 410, a communication hole 312, and a ventilation channel 222 to be described later are arranged along a path along which the fluid travels. Along the path along which the fluid flows, the fluid travels through the ventilation channel 222, the blocking portion 120, the communication hole 312, and the discharge hole 410 in a sequential manner. In this connection, the ventilation channel 222, the blocking portion 120, the communication hole 312, and the discharge hole 410 are arranged such that fluid paths in which the fluid passes through the ventilation channel 222, the blocking portion 120, the communication hole 312, and the discharge hole 410, respectively do not coincide with each other. Thus, the fluid that has passed through the ventilation channel 222 is blocked with the blocking portion 120 and bypasses the blocking portion. The fluid that has passed through the ventilation channel 122 between the blocking portions 120 is blocked with an insulating film 310 between the communication holes 312. Accordingly, a fluid path is bent such that the fluid which has passed through the channel 122 between the blocking portions 120 passes through the communication hole 312. In this way, the communication hole 312 and the discharge hole 410 are also arranged so that fluid paths defined by the communication hole 312 and the discharge hole 410 do not coincide with each other and thus the fluid flows in a curved manner. The dividing unit 200 includes a plurality of grids 210 and insulating caps 220. Both opposing sides of each of the grids 210 are inserted into both opposing receiving grooves 110, respectively. Each insulating cap 220 is coupled to an upper end of each of the plurality of grids 210. The open ventilation channel 222 is defined between adjacent grids 210. A diagram of the dividing unit 200 is shown in detail in FIGS. 3 and 4, and thus the dividing unit will be described in detail below.

The filter unit 300 includes an insulating film 310, a first filter 320 and a second filter 330. The insulating film 310 is made of an insulating material and is embodied as a plate-shaped member with a predefined thickness. Further, the insulating film 310 is formed to have an area corresponding to an area of the outlet. The insulating film 310 has a plurality of communication holes 312 extending through a plate-like face thereof. The communication hole 312 is positioned so as not to coincide with the ventilation channel 122 between the blocking portions 120, as described above. The insulating film 310 prevents the arc from spreading to a top of the outlet. Further, the insulating film 310 prevents the gas resulting from the evaporation of the molten metal from being spread from the inner space of the chamber unit 100 to the outlet.

The first filter 320 and the second filter 330 overlap each other and are coupled to the outlet. The first filter 320 and the second filter 330 filter out at least one predefined substance from the fluid discharged to the top through the outlet. Specifically, the first filter 320 and the second filter 330 filters out scattering matters resulting from the evaporation of the molten metal and due to the arc generated at the contacts of the circuit breaker.

In this connection, a pore size of the second filter 330 is smaller than a pore size of the first filter 320. The gas to be discharged to the outside passes through the first filter 320 first and then through the second filter 330.

The cover unit 400 is disposed on the outside of the filter unit 300 and is coupled to the outlet.

The cover unit 400 includes a plurality of discharge holes 410 defined therein. The discharge holes 410 of the cover unit 400 discharge the fluid from which the scattering matters have been removed while the fluid passes through the first filter 320 and the second filter 330 of the filter unit 300.

The arc runner 500 is disposed between the arc-extinguishing apparatus and the contact of the circuit breaker. The arc runner 500 traps the arc generated at the contact of the circuit breaker and guides the art to the inside of the chamber unit 100.

Figure 3:
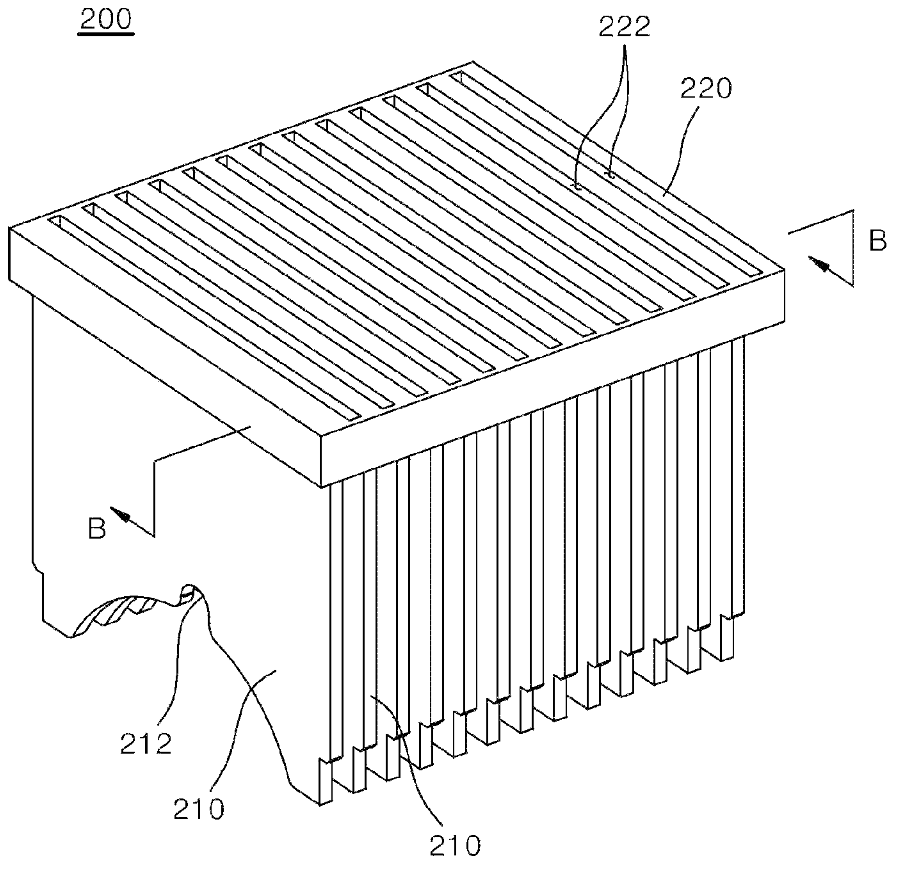
FIG. 3 is a perspective view showing a dividing unit in an arc-extinguishing apparatus according to an embodiment of the present disclosure.
Figure 4:
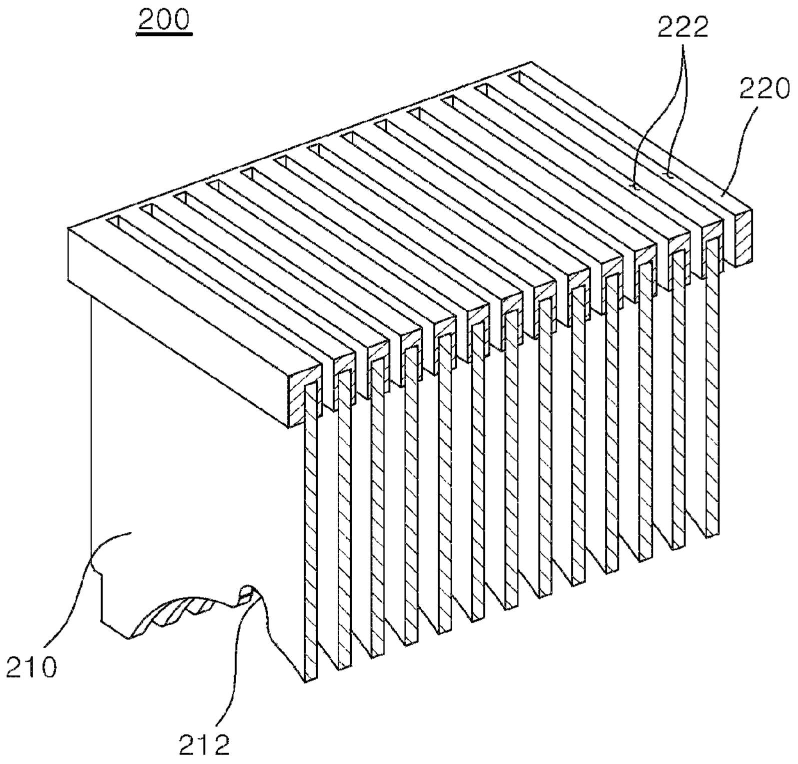
FIG. 4 is a cross-sectional view taken along a line B-B of FIG. 3.

FIG. 3 is a perspective view showing the dividing unit in the arc-extinguishing apparatus according to an embodiment of the present disclosure, and FIG. 4 is a cross-sectional view taken along a line B-B of FIG. 3.

As shown in FIG. 3 and FIG. 4, in the arc-extinguishing apparatus according to an embodiment of the present disclosure, the dividing unit 200 includes the plurality of grids 210 and insulating caps 220.

The grid 210 is made of carbon steel. The grid 210 is embodied as a plate-shaped member with a predefined thickness. Further, in an embodiment of the present disclosure, the grid 210 has both opposing sides and a center portion therebetween. A length of each of the opposing sides is larger than a length of the center portion. Accordingly, the plate-shaped grid 210 is shaped such that a vertical length is smaller as the grid extends toward the center portion from each of both opposing sides. Further, the grid 210 includes a recess 212 upwardly recessed from a bottom end. The recess 212 acts as a path through which the arc generated from the circuit breaker passes. The plurality of grids 210 are arranged and spaced from each other by a predefined spacing while facing toward each other. An upper end of each of the plurality of grids 210 is accommodated in each insulating cap 220. Each insulating cap 220 accommodates therein the upper end of each grid 210 and a portion of each of both opposing sides thereof and is coupled thereto. The insulating cap 220 is made of insulating material. Further, the ventilation channel 222 extending vertically is defined between the adjacent grids 210. The ventilation channel 222 extends along the longitudinal direction of the grid 210.

Figure 5:
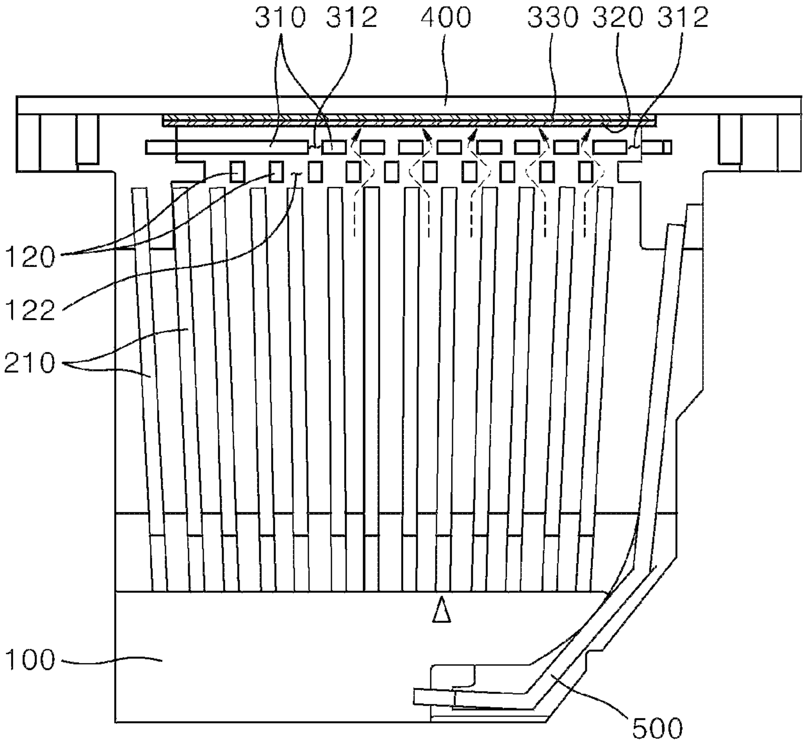
PRIOR ART FIG. 5
FIG. 5 is a cross-sectional view of a conventional arc-extinguishing apparatus for an air circuit breaker, compared with the apparatus of FIG. 2.

FIG. 5 is a cross-sectional view of a conventional arc-extinguishing apparatus for an air circuit breaker compared with the apparatus of FIG. 2.

When the apparatus of FIG. 2 is compared with the conventional arc-extinguishing apparatus for the air circuit breaker, the latter does not include the insulating cap 220 at the upper end of the grid 210, unlike the arc-extinguishing apparatus according to an embodiment of the present disclosure. Accordingly, the upper end of the grid 210 is exposed inside the chamber unit 100. Thus, the instantaneously occurring arc may be spread to a path such as the upper end of the grid rather than a predefined path.

FIG. 2 shows a path to which an arc is guided in the dividing unit of the arc-extinguishing apparatus according to an embodiment of the present disclosure.

Figure 6:
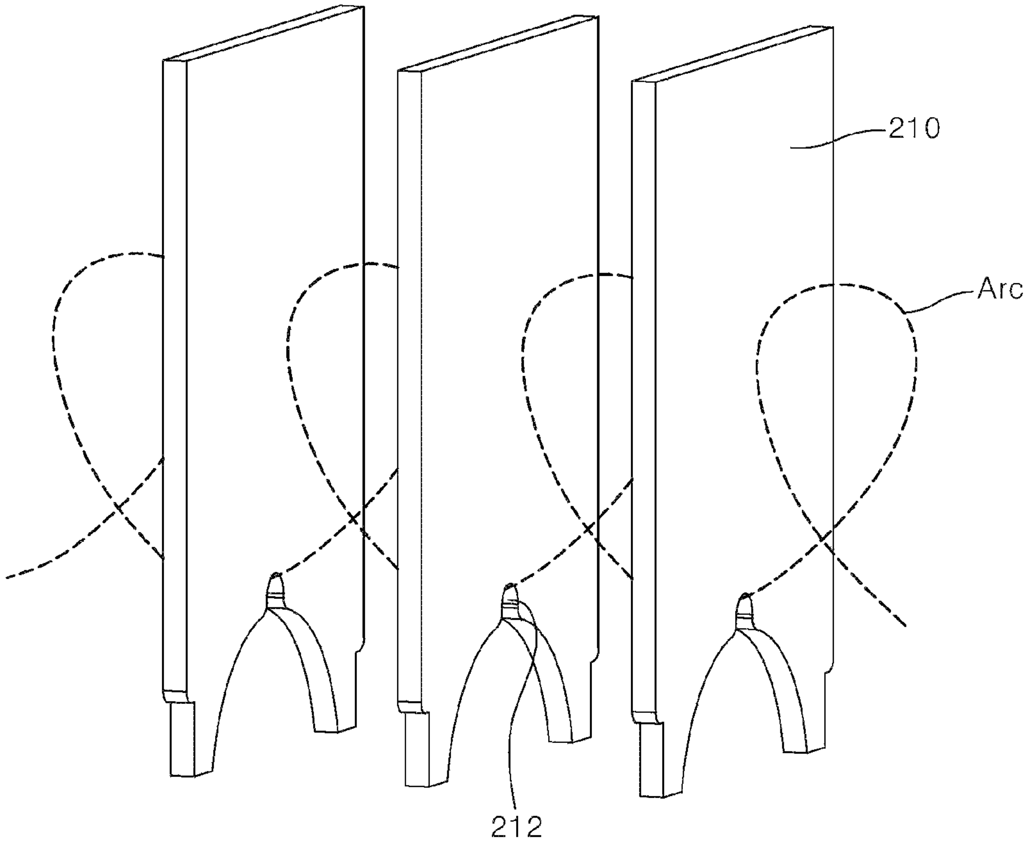
PRIOR ART FIG. 6
FIG. 6 shows a path to which an arc is guided in a grid of the conventional arc-extinguishing apparatus for the air circuit breaker.
Figure 7:
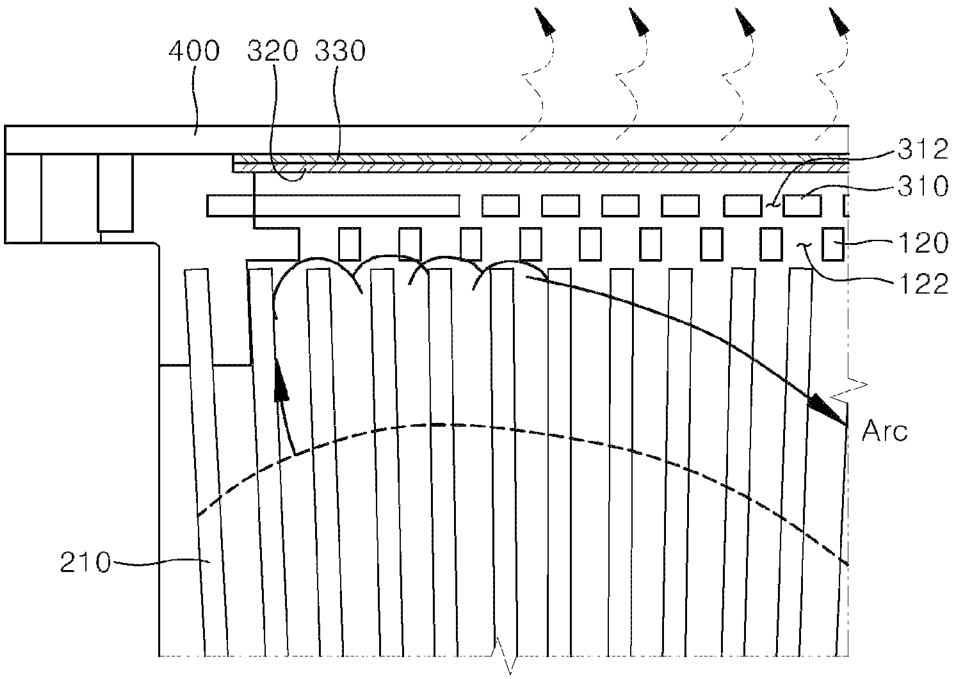
PRIOR ART FIG. 7
FIG. 7 shows a state in which the arc is divided into multiple paths in the conventional arc-extinguishing apparatus for the air circuit breaker.

FIG. 6 shows a path to which an arc is guided in a grid of the conventional arc-extinguishing apparatus for the air circuit breaker. FIG. 7 shows a state in which the arc is divided into multiple paths in the conventional arc-extinguishing apparatus for the air circuit breaker.

An operation of the arc-extinguishing apparatus according to the present disclosure will be described with reference to FIG. 2, FIG. 6 and FIG. 7.

In the conventional arc-extinguishing apparatus for the air circuit breaker and the arc-extinguishing apparatus for the air circuit breaker according to an embodiment of the present disclosure, the arc generated from the contact extends along the recess 212 of the grid 210 and rotates in a space between the grids 210 and travels continuously between the spaces between the grids, as shown in FIG. 6, Therefore, the arc generated between the contacts of the circuit breaker is guided to the predefined path and the current is cut off.

However, as shown in FIG. 7, in the conventional arc-extinguishing apparatus, the upper end of the grid 210 is exposed inside the chamber unit 100. Accordingly, the arc may travel discontinuously along the recesses 212 and thus a portion of the arc may be branched to the upper portion of the grid 210. This not only lowers the breaking performance of the circuit breaker, but also causes the current cutting-off operation to fail.

On the contrary, in the arc-extinguishing apparatus according to an embodiment of the present disclosure, the arc and the scattering matters of the molten metal are introduced into the inner space from a bottom of the chamber unit 100. In this connection, the arc is guided along the recesses 212 respectively formed in the lower ends of the grids 210. As shown in FIG. 2, in the arc-extinguishing apparatus according to an embodiment of the present disclosure, the upper end of the grid 210 and the portion of each of both opposing sides thereof are accommodated in each insulating cap that is made of an insulating material. Therefore, the arc is not branched to the upper end of the grid 210 but travels continuously along the recesses 212 as the predetermined path. Accordingly, the situation in which the arc may travel discontinuously along the recesses 212 and thus a portion of the arc may be branched to the upper portion of the grid 210 may be prevented. This not only ensures the performance of the circuit breaker, but also prevents the failure of the current interruption.

As described above, the present disclosure has been described with reference to the illustrated drawings. However, the present disclosure is not limited to the embodiments and drawings disclosed in the present specification. It is evident that various modifications may be made to the disclosure by those of ordinary skill in the art and within the scope of the technical idea of the present disclosure. In addition, although an effect of a configuration of the present disclosure has not been explicitly described above while illustrating the embodiments of the present disclosure, it is natural that an effect predictable from the configuration should also be appreciated.

What is claimed is:

1. An arc-extinguishing apparatus for an air circuit breaker, the apparatus comprising a chamber unit having a fluid outlet through which internal fluid is discharged out of the chamber unit, wherein the chamber unit has receiving grooves defined in each of opposing inner faces thereof;

a dividing unit coupled to an inner face of the chamber unit for dividing a path of the fluid to be discharged to the outlet into multiple paths;

a filter unit disposed at the outlet for filtering at least one predefined substance from the fluid passing through the outlet; and a cover unit having a plurality of discharge holes defined therein, wherein the cover unit is disposed on an outer face of the filter unit and is coupled to the outlet, wherein the dividing unit includes:

a plurality of grids, wherein both opposing sides of each of the grids are respectively inserted into both the opposing receiving grooves respectively defined in the opposing inner faces of the chamber unit; and each insulating cap coupled to an upper end of each of the plurality of grids, wherein each open ventilation channel is defined between adjacent grids.

2. The apparatus of claim 1, wherein the outlet of the chamber unit includes each blocking portion formed in a position corresponding to each ventilation channel.

3. The apparatus of claim 2, wherein the ventilation channels, the blocking portions, and the discharge holes are arranged such that the fluid that has passed through the ventilation channel is blocked with the blocking portion, and the fluid that has passed through the blocking portion is blocked with the cover unit, and the fluid flowing into the channel between the grids travels in at least one curved manner and then reaches the discharge hole.

4. The apparatus of claim 1, wherein the insulating caps are integral with each other, and the plurality of grids are respectively coupled to bottom faces of the caps.

5. The apparatus of claim 1, wherein the filter unit includes:

a first filter disposed adjacent to the dividing unit; and a second filter disposed adjacent to the cover unit.

6. The apparatus of claim 5, wherein a pore size of the second filter is smaller than a pore size of the first filter.

7. The apparatus of claim 1, wherein the apparatus further comprises an insulating film disposed between the dividing unit and the filter unit, wherein the insulating film has multiple communication holes defined therein through which the fluid passes.

8. The apparatus of claim 1, wherein each insulating cap accommodates therein an upper end of each grid and a portion of each of both opposing sides of each grid.

9. The apparatus of claim 8, wherein the insulating cap prevents a situation where a portion of the fluid is branched to a top of the grid.

* * * * *